(12) United States Patent
Blaker

(10) Patent No.: US 6,691,143 B2
(45) Date of Patent: Feb. 10, 2004

(54) ACCELERATED MONTGOMERY MULTIPLICATION USING PLURAL MULTIPLIERS

(75) Inventor: David M. Blaker, Chapel Hill, NC (US)

(73) Assignee: CyberGuard Corporation, Ft. Lauderdale, FL (US)

( * ) Notice: Subject to any disclaimer, the term of this patent is extended or adjusted under 35 U.S.C. 154(b) by 430 days.

(21) Appl. No.: 09/849,667

(22) Filed: May 4, 2001

(65) Prior Publication Data

US 2002/0013799 A1 Jan. 31, 2002

Related U.S. Application Data

(60) Provisional application No. 60/203,409, filed on May 11, 2000.

(51) Int. Cl.[7] .................................................. G06F 7/38

(52) U.S. Cl. ....................................................... 708/491

(58) Field of Search ................................ 708/491–492; 380/28, 30

(56) References Cited

U.S. PATENT DOCUMENTS

| | | | |
|---|---|---|---|
| 5,274,707 A | 12/1993 | Schlafly ........................ | 380/30 |
| 5,329,623 A | 7/1994 | Smith et al. .................. | 395/275 |
| 5,513,133 A | 4/1996 | Cressel et al. ............... | 364/754 |
| 5,961,626 A | 10/1999 | Harrison et al. ............. | 710/129 |
| 5,987,131 A * | 11/1999 | Clapp ........................... | 380/30 |
| 6,061,706 A | 5/2000 | Gai et al. ..................... | 708/491 |
| 6,081,895 A | 6/2000 | Harrison et al. ............. | 713/189 |
| 6,085,210 A | 7/2000 | Buer ............................. | 708/491 |
| 6,185,596 B1 | 2/2001 | Hadad et al. ................. | 708/491 |
| 6,209,016 B1 * | 3/2001 | Hobson et al. ............... | 708/491 |
| 6,219,789 B1 | 4/2001 | Little et al. .................. | 713/200 |
| 2002/0120658 A1 * | 8/2002 | Chen et al. ................... | 708/491 |

FOREIGN PATENT DOCUMENTS

| | | |
|---|---|---|
| EP | 0 531 158 A2 | 3/1993 |
| EP | 0 601 907 A2 | 6/1994 |
| EP | 0 656 709 A2 | 6/1995 |

OTHER PUBLICATIONS

Gutub et al. entitled *An Expandable Montgomery Modular Multiplication Processor*, Eleventh International Conference on Microelectronics, Nov. 22–24, 1999, pp. 173–176.
Tenca et al. entitled *A Scalable Architecture for Montgomery Multiplication*, First International Workshop, Cryptographic Hardware and Embedded Systems, Lecture Notes on Computer Science, vol. 1717, 1999, pp. 94–108.

(List continued on next page.)

*Primary Examiner*—Tan V. Mai
(74) *Attorney, Agent, or Firm*—Myers Bigel Sibley & Sajovec

(57) ABSTRACT

Montgomery multipliers and methods modular multiply a residue multiplicand by a residue multiplier to obtain a residue product, using a scalar multiplier, a first vector multiplier and a second vector multiplier. A controller is configured to control the scalar multiplier, the first vector multiplier and the second vector multiplier, to overlap scalar multiplies using a selected digit of the multiplier and vector multiplies using a modulus and the multiplicand. The scalar multiplier is configured to multiply a least significant digit of the multiplicand by a first selected digit of the multiplier, to produce a scalar multiplier output. The first vector multiplier is configured to multiply the scalar multiplier output by a modulus, to produce a first vector multiplier output. The second vector multiplier is configured to multiply a second selected digit of the multiplier by the multiplicand, to produce a second vector multiplier output. An accumulator is configured to add the first vector multiplier output, and the second vector multiplier output, to produce a product output. The latency of Montgomery multiplication thereby can be reduced to nearly the latency of a single scalar multiplication.

40 Claims, 12 Drawing Sheets

OTHER PUBLICATIONS

Freking et al. entitled *Montgomery Modular Multiplication and Exponentiation in the Residue Number System*, Conference Record of the Thirty–Third Asilomar Conference Signals, Systems, and Computers, vol. 2, 1999, pp. 1312–1316.

Menezes et al., Chapter 14, *Efficient Implementation, Handbook of Applied Cryptography* CRC Press, Inc., 1997, p. 591–634.

International Search Report, PCT/US01/14616, Feb. 27, 2002.

International Search Report, PCT/US01/14561, Feb. 27, 2002.

Tiountchik, *Systolic Modular Exponentiation Via Montgomery Algorithm*, Electronics Letters, vol. 34, No. 9, Apr. 30, 1998, pp. 874–875.

Koç et al., *Analyzing and Comparing Montgomery Multiplication Algorithms, IEEE Micro*, vol. 16, No. 1, Jun. 1, 1996, pp. 26–33.

Eldridge et al., *Hardware Implementation of Montgomery's Modular Multiplication Algorithm*, IEEE Transactions on Computers, vol. 42, No. 6, Jun. 1993, pp. 693–699.

Sauerbrey, *A Modular Exponentiation Unit Based on Systolic Arrays*, Advances in Cryptology–Auscrypt. Gold Coast, Queensland, Dec. 13–16, 1992, Proceedings of the Workshop on the Theory and Application of Cryptographic Techniques, vol. Conf. 3, Dec. 13, 1992, pp. 505–516.

Kent et al. *Security Architecture for the Internet Protocol.* Nov. 1998, pp. 1–66.

Hifn 6500 Public Key Processor. http://www.hifn.com/products/6500.html, printed Apr. 29, 2001.

FastMap Integrated Circuit. Rainbow Technologies Internet Security Group. Oct. 1, 1998.

Preuss, Lisa. "Rainbow Technologies Announces OEM Availability of FastMap High Performance Public Key Integrated Circuit Processor," News Release. Atlanta, GA, Oct. 21, 1998.

SafeNet: OEM Solutions. www.safenet–inc.com/technology/chips/Chip2141.asp, printed Apr. 29, 2001.

Suchmann, David. *Electronic Products: Novel Approach to Chip Design Improves SSL Encryption.* Sep. 3, 2001.

*NetOctave Announces SSL and IPSec Security Accelerator Boards.* News Release, Sep. 11, 2001.

*Next–generation Applications Need IPSec Security: NetOctave IPSec Solutions.* Brochure, Mar., 2001.

*Next–generation Applications Need SSL Security: NetOctave SSL Solutions.* Brochure, Mar., 2001.

\* cited by examiner

ACCELERATED MONTGOMERY MULTIPLICATION USING PLURAL MULTIPLIERS

CROSS REFERENCE TO RELATED APPLICATION

This application claims the benefit of provisional application Ser. No. 60/203,409, filed May 11, 2000, entitled *Cryptographic Acceleration Methods and Apparatus*, the disclosure of which is hereby incorporated herein in its entirety as if set forth fully herein.

FIELD OF THE INVENTION

This invention relates to multiplication circuits and methods, and more particularly to Montgomery multiplication circuits and methods.

BACKGROUND OF THE INVENTION

Montgomery multiplication is widely used to perform modular multiplication. Modular multiplication is widely used in encryption/decryption, authentication, key distribution and many other applications. Montgomery multiplication also may be used for the basis for Montgomery exponentials, which also is widely used in the above-described and other applications.

Montgomery multiplication is described in U.S. Pat. No. 6,185,596 to Hadad et al. entitled *Apparatus & Method for Modular Multiplication & Exponentiation Based on Montgomery Multiplication*; U.S. Pat. No. 6,061,706 to Gai et al. entitled *Systolic Linear-Array Modular Multiplier with Pipeline Processing Elements*; U.S. Pat. No. 6,085,210 to Buer entitled *High-Speed Modular Exponentiator and Multiplier*; U.S. Pat. No. 5,513,133 to Cressel et al. entitled *Compact Microelectronic Device for Performing Modular Multiplication and Exponentiation Over Large Numbers*; and European Patent Application 0 656 709 A2 to Yamamoto et al. entitled *Encryption Device and Apparatus for Encryption/Decryption Based on the Montgomery Method Using Efficient Modular Multiplication*. Montgomery multiplication also is described in publications by Gutub et al. entitled An *Expandable Montgomery Modular Multiplication Processor*, Eleventh International Conference on Microelectronics, Nov. 22–24, 1999, pp. 173–176; Tenca et al. entitled *A Scalable Architecture for Montgomery Multiplication*, First International Workshop, Cryptographic Hardware and Embedded Systems, Lecture Notes on Computer Science, Vol. 1717, 1999, pp. 94–108; and Freking et al. entitled *Montgomery Modular Multiplication and Exponentiation in the Residue Number System*, Conference Record of the Thirty-Third Asilomar Conference Signals, Systems, and Computers, Vol. 2, 1999, pp. 1312–1316. The disclosure of all of these references is hereby incorporated herein in their entirety as if set forth fully herein.

Montgomery multiplication often is used with large numbers. Accordingly, it may be desirable to accelerate Montgomery multiplication so that rapid encryption/decryption, authentication, key management and/or other applications may be provided.

SUMMARY OF THE INVENTION

Embodiments of the invention provide Montgomery multipliers and methods that modular multiply a residue multiplicand by a residue multiplier to obtain a residue product. Embodiments of Montgomery multipliers and methods include a scalar multiplier, a first vector multiplier and a second vector multiplier. A controller is configured to control the scalar multiplier, the first vector multiplier and the second vector multiplier, to overlap scalar multiplies using a selected digit of the multiplier and vector multiplies using a modulus and the multiplicand. It will be understood that as used herein, digit refers to a number place in any base number system, including decimal, hexidecimal and binary. The latency of Montgomery multiplication thereby can be reduced to nearly the latency of a single scalar multiplication.

Montgomery multipliers and methods according to other embodiments of the invention include a scalar multiplier that is configured to multiply a least significant digit of the multiplicand by a first selected digit of the multiplier, to produce a scalar multiplier output. A first vector multiplier is configured to multiply the scalar multiplier output by a modulus, to produce a first vector multiplier output. A second vector multiplier is configured to multiply a second selected digit of the multiplier by the multiplicand, to produce a second vector multiplier output. An accumulator is configured to add the first vector multiplier output and the second vector multiplier output, to produce a product output. The first selected digit of the multiplier preferably is a next more significant digit of the multiplier, relative to the first selected digit of the multiplier.

In other embodiments of the invention, the scalar multiplier is further configured to multiply the least significant digit of the multiplicand by the first selected digit of the multiplier and by one over (i.e., divided by) a negative of a least significant digit of the modulus, to produce the scalar multiplier output. In yet other embodiments, a first multiplexer also may be provided that is configured to multiplex the least significant digit of the multiplicand and one over the negative of the least significant digit of the modulus into the scalar multiplier.

In still other embodiments of the invention, a first feedback path is configured to feed the scalar multiplier output back into the scalar multiplier. A second feedback path is configured to feed the product output into the scalar multiplier. A summer is configured to sum the scalar multiplier output and the product output from the respective first and second feedback paths and to provide the sum of the scalar multiplier output and the product output to the scalar multiplier. A second multiplexer also is provided that is configured to multiplex the first selected digit of the multiplier and the sum of the scalar multiplier output and the product output into the scalar multiplier. A first register is coupled between the scalar multiplier output and the first vector multiplier and a second register is coupled between the product output and the second feedback path. Accordingly, latency in Montgomery multiplication can be reduced.

DETAILED DESCRIPTION OF PREFERRED EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The Montgomery multiplication algorithm described below is Algorithm 14.36 in Menezes et al., *Handbook of Applied Cryptography*, CRC Press, Inc., 1997, p. 602, the disclosure of which is hereby incorporated herein in its entirety as if set forth fully herein. In embodiments of the invention, the algorithm operates on digits of the numbers.

Each number is divided into n digits of WORD_SIZE length. The inputs are a modulus m, a multiplier x, and a multiplicand y, each of which is an R residue modulo m, $R=2^{n*WORD\_SIZE}$, and $m'=-m[0]^{-1} \mod 2^{WORD\_SIZE}$. The algorithm is:

a=0
for i from 0 to n−1 do {
 $u[i]=((a[0]+x[i]*y[0])*m') \mod 2^{WORD\_SIZE}$;
 $a=(a+x[i]*y+u[i]*m)/2^{WORD\_SIZE}$,
}
if a≧m{
 a=a−m;
}
return (a);

Embodiments of the present invention can simultaneously use three multipliers to accelerate Montgomery multiplication. Embodiments of the present invention may stem from recognitions that the calculation of u[i] in the Montgomery algorithm, i.e., $u[i]=((a[0]+x[i]*y[0])*m') \mod 2^{WORD\_SIZE}$, involves two scalar multiplies, whereas the calculation of a in the Montgomery algorithm, i.e., $a=(a+x[i]*y+u[i]*m)/2^{WORD\_SIZE}$, involves two vector multiplies. Moreover, the results of the scalar multiplication are used in order to perform one of the vector multiplications. Embodiments of the invention can allow the vector multiplication at the end of each loop iteration to overlap with the scalar multiplications at the beginning of the next loop iteration. Accordingly, embodiments of the invention can exploit parallelism of the Montgomery multiplication algorithm, and can execute the scalar multiplication with reduced, and preferably minimum, latency, and increased, and preferably maximum, possible throughput, which may be limited mainly by the multipliers.

Figure 1:
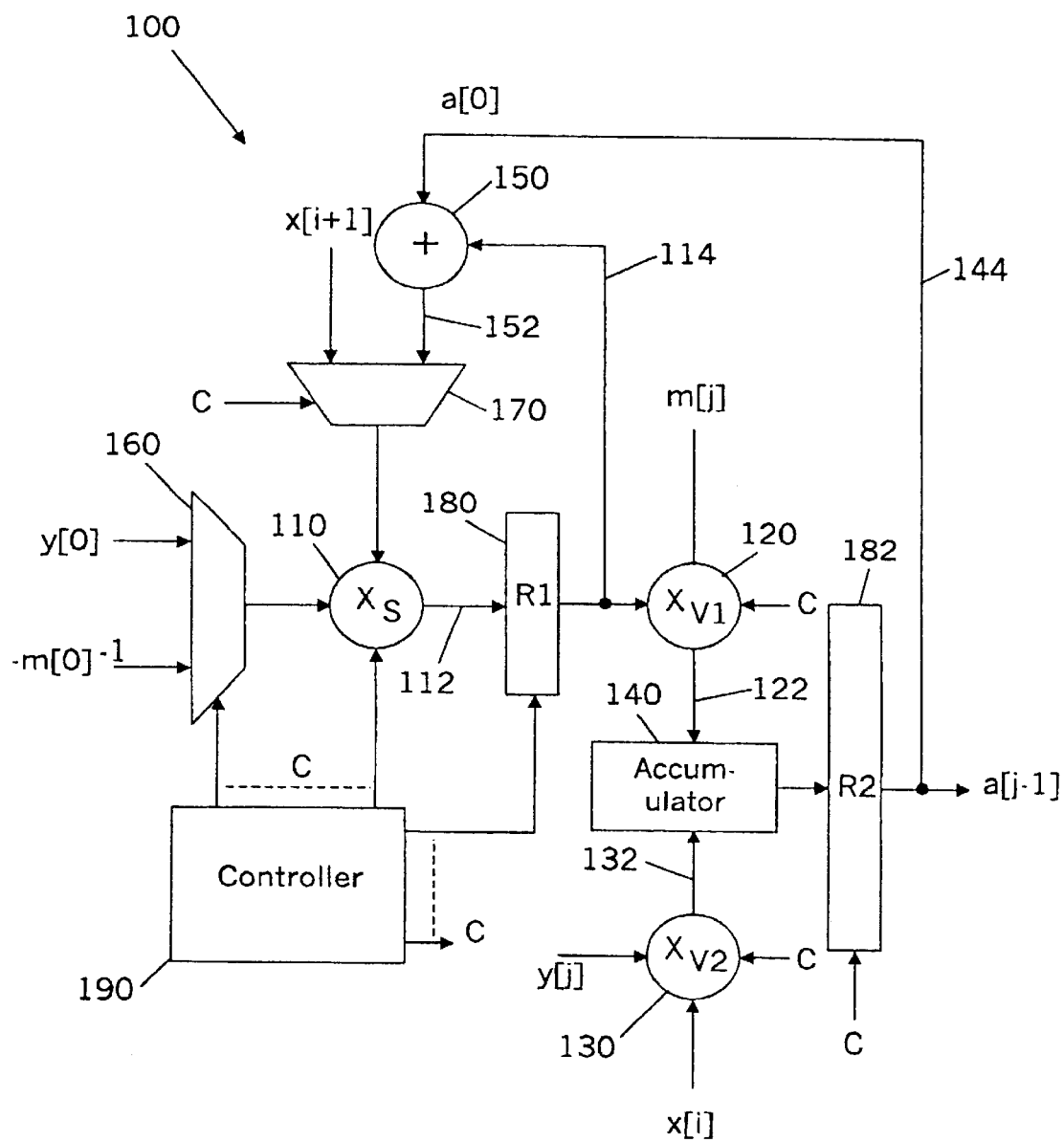
FIG. 1 is a block diagram of Montgomery multipliers and methods according to embodiments of the present invention.

Referring now to FIG. 1, Montgomery multipliers and methods according to embodiments of the invention are illustrated. These embodiments preferably are embodied in one or more integrated circuit chips. As shown in FIG. 1, embodiments of Montgomery multipliers and methods 100 include a scalar multiplier 110, denoted in FIG. 1 by $x_s$, that is configured to multiply a least significant digit y[0] of the multiplicand y by a first selected digit x[0] of the multiplier x, to produce a scalar multiplier output 112. A first vector multiplier 120, denoted in FIG. 1 by $x_{v1}$, is configured to multiply the scalar multiplier output 112 by a modulus m[j], to produce a first vector multiplier output 122. A second vector multiplier 130, denoted in FIG. 1 by $x_{v2}$, is configured to multiply a second selected digit x[i] of the multiplier x by the multiplicand y[j], to produce a second vector multiplier output 132. The second selected digit preferably is a next more significant digit of the multiplier x, relative to the first selected digit. An accumulator 140, is configured to add the first vector multiplier output 122 and the second vector multiplier output 132, to produce a product output, denoted in FIG. 1 by a[j−1].

Still referring to FIG. 1, in other embodiments, the scalar multiplier 110 is further configured to multiply the least significant digit y[0] of the multiplicand y, by the first selected digit x[0] of the multiplier x, and by 1 over a negative of a first digit of the modulus $\mod 2^{WORD\_SIZE}$, denoted in FIG. 1 as $-m[0]^{-1}$, to produce the scalar multiplier output 112. More particularly, a first multiplexer 160 is configured to multiplex the least significant digit y[0] of the multiplicand y, and 1 over a negative of a first digit of the modulus, $-m[0]^{-1}$, into the scalar multiplier 110.

Still referring to FIG. 1, in other embodiments, a first feedback path 114 is configured to feed the scalar multiplier output 112 back into the scalar multiplier 110. A second feedback path 144 is configured to feed the product output a[0] back into the scalar multiplier 110. The first and second feedback paths 114 and 144, respectively, are configured to be applied to a summer 150, such that the summer 150 is configured to sum the scalar multiplier output 112 and the product output a[0] from the respective first and second feedback paths 114 and 144, and to provide the sum 152 of the scalar multiplier output 112 and the product output a[0] to the scalar multiplier 110.

Still referring to FIG. 1, in yet other embodiments, a second multiplexer 170 may be provided that is configured to multiplex the first selected digit x[i−1] of the multiplier x, and the sum 152 of the scalar multiplier output 112 and the product output a[j−1], into the scalar multiplier 110. In other embodiments, a first register 180, denoted by R1 in FIG. 1, is coupled between the scalar multiplier output 112 and the first vector multiplier 120. A second register 182, denoted by R2 in FIG. 1, is coupled between the accumulator 140 and the second feedback path 144.

Finally, in still other embodiments, a controller 190 is provided that outputs a plurality of control signals C that are configured to control the first multiplexer 160, the second multiplexer 170, the scalar multiplier 110, the first and second vector multipliers 120 and 130, and/or the first and second registers 180 and 182, as shown in FIG. 1. It will be understood that the controller also may be used to control the accumulator 140 and the summer 150, and also may be used to control the inputs to the multiplexers 160 and/or 170 and/or the multipliers 110, 120 and/or 130. It also will be understood that the input signals, such as the multiplier x and the multiplicand y also may be provided to the controller 190 and distributed by the controller in a manner shown in FIG. 1.

In general, the controller 190 is configured to control the scalar multiplier 110, the first vector multiplier 120, and the second vector multiplier 130, to overlap scalar multiplies using a selected digit of the multiplier, and vector multiplies using a modulus and the multiplicand, to thereby allow latency of Montgomery multiplication to be reduced to the latency of a single scalar multiplication. It will be understood by those having skill in the art that the controller 190 may be embodied as special purpose computer(s), general purpose computer(s) running a stored program(s), logic gates, application-specific integrated circuit(s), programmable logic controller(s), state machine(s), combinations thereof and/or other controller configurations well known to those having skill in the art.

Figure 2:
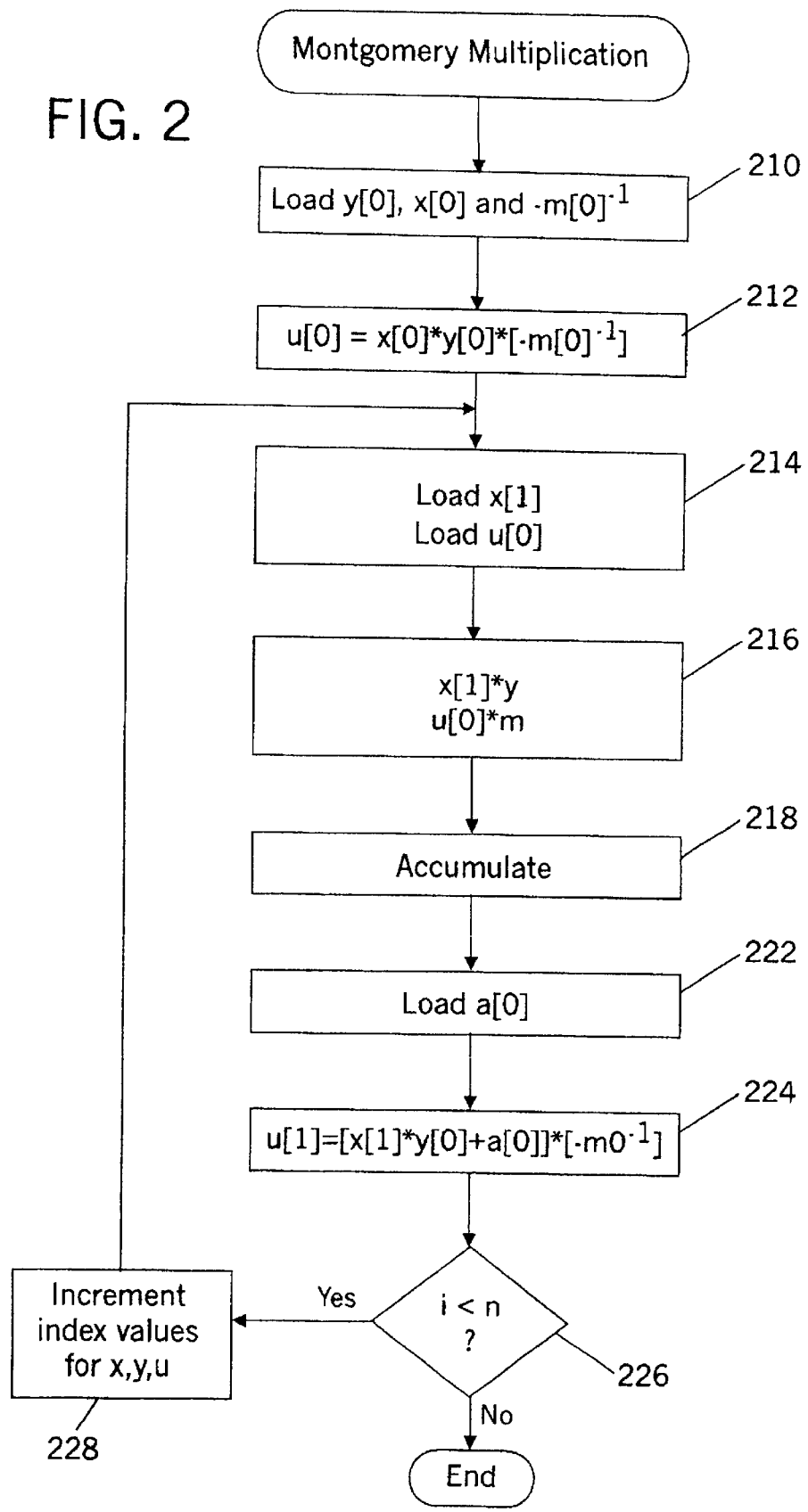
FIG. 2 is a flowchart illustrating operations for performing Montgomery multiplication according to embodiments of the present invention.
Figure 3:
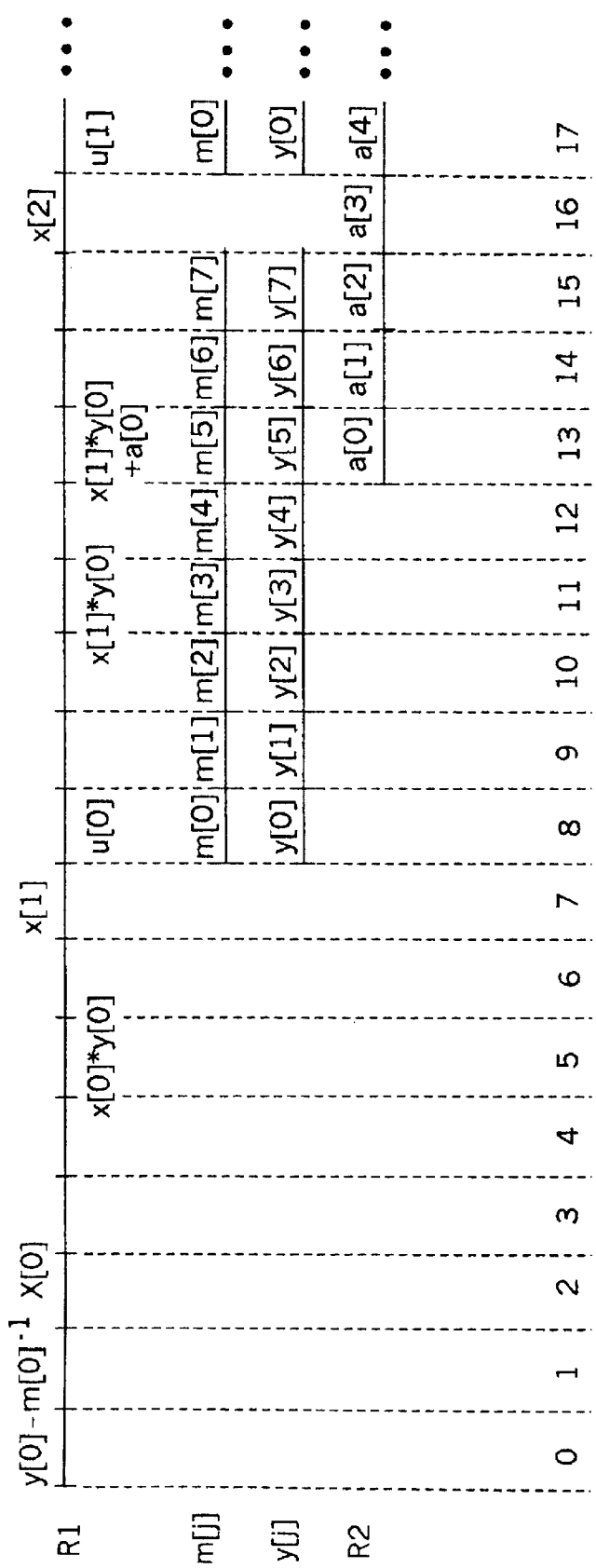
FIG. 3 is a timing diagram that illustrates timing of operations for performing Montgomery multiplication according to embodiments of the present invention.

FIG. 2 is a flowchart that illustrates operations for performing Montgomery multiplication according to embodiments of the present invention. These operations may be performed by the controller 190 of FIG. 1. FIG. 3 is a timing diagram illustrating timing of operations over a series of cycles, according to embodiments of the invention.

Referring now to FIGS. 1, 2 and 3, the least significant digit y[0] of the multiplicand y, the least significant digit x[0] of the multiplier x, and $-m[0]^{-1}$, are loaded, for example, into the multiplexers 160 and 170 of FIG. 1, as shown at Block 210. The loading may be accomplished during time intervals 0, 1 and 2 of FIG. 3. It will be understood that the loading sequence may be changed, and intervals 3 and 4, during which no loading occurs, may be reduced or eliminated.

Then, referring to Block 212, a first scalar multiplier output 112, designated u[0], is computed by multiplying x[0]*y[0] using the first and second multiplexers 160 and 170, and the scalar multiplier 110. In FIG. 3, this multiplication is shown as occurring in time slot 5, with the results m[0] being produced in time slot 8. The first scalar multiplier output u[0] may be stored in the first register 180. At this point, there is no previous partial result, so u[0]=u[0]*(−m[0]$^{-1}$). This is a second scalar multiply, as shown in Block 212.

Then, referring to Block 214, the next most significant digit of the multiplier x[1] is loaded into the scalar multiplier 110, and x[0] is pipelined into the vector multiplier 120 via register 180, as shown at time slots 7 and 8 of FIG. 3. The vector multipliers 120 and 130, begin to multiply the modulus m by u[0], and also to multiply x[1] by y, as shown at Block 216 of FIG. 2 and at time slots 8–15 of FIG. 3. The results are accumulated at Block 218, and stored in the second register 182.

When the vector multipliers 120 and 130 and the accumulator 140 produce the first digit of the product a[0], at time slot 13 of FIG. 3, it is loaded, via the second feedback path 144, into the scalar multiplier 110 using the summer 150 and the second multiplexer 170, as shown at Block 222 of FIG. 2. The scalar multiplier 110 then begins to multiply x[1] by y[0] and add a[0] using the multiplexer 160, the multiplexer 170 and the summer 150, as shown at time slot 13. The result u[1] is produced at the output 112 of the scalar multiplier 110 in time slot 17 of FIG. 3 and at Block 224 of FIG. 2. Again, there is a second scalar multiply.

At Block 224, each digit of the multiplicand y is multiplied by the multiplier u and added to the previous partial result, producing a partial result having n+1 digits. The most significant n digits may be stored, for example, as n+1 digits plus an overflow bit, where the overflow bit may be stored in a register in the datapath. The least significant digit of each partial result is fed back to the scalar multiplier 110 for the next result via the second feedback path 144, so that this need not add any delay or latency to the result. Only the least significant digit may need an extra multiplier latency to fill the pipeline, as was shown in time slots 0–5 of FIG. 3. At the end of the multiplication of Block 224, m may be subtracted from the result. This subtraction also may be folded into the last loop of iteration. If the result is negative, m may be added back. Otherwise, operations may continue. The result may be copied to a register.

Then, referring to Block 226, as long as i is less than n, the index values for x, y and u are incremented by 1 at Block 228, and operations again proceed to Block 214, as shown in time slots 16 and 17 of FIG. 3. Thus, in one clock cycle after the end of a loop, x[i+2] for the next loop is loaded into the scalar multiplier 110, and simultaneously x[i+1] and u[i+1] are loaded into the vector multipliers 120 and 130. Since all of the multipliers may have the same latency, as long as twice the latency through the scalar multiplier 110 is less than or equal to the number of digits in the multiplicand y, the latency of the scalar multiplier 110 may only appear before the first vector multiply (time slots 0–5 of FIG. 3) and may be hidden thereafter. If not, then the performance may only square linearly, rather than as the square, for "small" numbers.

The total execution time for performing Montgomery multiplication according to embodiments of the invention that are illustrated in FIGS. 1–3 may be calculated as follows:

$$16 +$$
$$3 * (5 + \text{CEILING}(\text{len}[m]/64) - 1)) +$$
$$1.5 * \text{len}[\text{exponent}] *$$
$$\{12 + (\text{CEILING}(\text{len}[m]/64) * (\text{CEILING}((\text{len}[m])/64 + 1) +$$
$$(5 + (\text{CEILING}(\text{len}[m]/64) - 1)\};$$

where len denotes length. Accordingly, the latency of a single Montgomery multiplication can be reduced to nearly the latency of a single scalar multiplication.

The scalar multiplier 110 performs two successive scalar multiplies for each digit of the multiplier. This latency may remain, because the first output u[0], of the scalar multiplier 110, is generated before the two vector multipliers 120 and 130 can start iterating over the multiplicand digits (y[j]) and the multiplier digits (x[i]). After u[0], the scalar multiplier 110 starts the calculations for the second multiplier digit in parallel with the completion of the vector multiplications for the first multiplier digit. For numbers with as many digits as the depth of the scalar multiplier 110, there need be no additional latency. For smaller numbers, there may be some added latency because of the scalar multiplier pipeline, but this additional latency still can be less than without the overlapped multiplications.

EXAMPLE

The following Example provides a detailed structural and functional description of a Public Key Engine (PKE) that includes accelerated Montgomery multiplication according to embodiments of the invention. This Example is illustrative and shall not be construed as limiting.

The Public Key Engine (PKE) calculates functions of large numbers modulo another large number. Moduli up to $2^{MAX\_LENGTH}-1$ are supported, where MAX_LENGTH=4, 096 for the present Example. Large numbers are partitioned into digits of WORD_SIZE bits each, where WORD_SIZE=128 for the present Example. The length of large numbers are always given in number of digits. The PKE supports the following functions: Mod: r=a mod m; R Mod: r=R mod m, where R is defined as $2^{WORD\_SIZE*len[m]}$, and is internally generated by the PKE; Addition: r=a+b mod m; Subtraction: r=a−b mod m; Additive Inverse: r=−a mod m; Multiplication: r=a *b mod m; Multiplicative inverse: r=a$^{-1}$ mod m; and Exponentiation: r=g$^e$ mod m. Exponentiation uses Montgomery's algorithm. Inputs are: a=g·R mod m, b=e, c=−m[0]$^{-1}$ mod $2^{WORD\_SIZE}$, and m. Note that m must be odd, else c does not exist.

Table 1 below lists restrictions on a, b, m and r for all functions.

TABLE 1

| | Restrictions on (a, b, m, r) for all functions |
|---|---|
| m | $1 \leq \text{len}[m] \leq 32$ |
| | $\text{offset}[m] + \text{len}[m] \leq 256$ |
| | $m_{MSD} \neq 0$ |
| a | $1 \leq \text{len}[a] \leq 32$ |
| | $\text{offset}[a] + \text{len}[a] \leq 256$ |
| b | $1 \leq \text{len}[b] \leq 32$ |
| | $\text{offset}[b] + \text{len}[b] \leq 256$ |
| r | $\text{offset}[r] + \text{len}[m] \leq 256; \text{len}[r] = \text{len}[m]$ |

Table 2 below gives additional restrictions on operands a and b for each function. Note that for functions in which operands a or b may contain fewer digits than m, these operands will be automatically left-padded with "0" digits by the hardware (but the padding digits will not actually be written to the Cache).

TABLE 2

| Function | Additional restriction(s) on a | Additional restriction(s) on b | Error flags that could be set (see Table 6) |
|---|---|---|---|
| Mod | none | n/a | 1, 2 |
| R Mod | n/a | n/a | 1, 2 |
| Addition | len(a) <= len(m) | len(b) <= len(m) | 1, 2, 3, 4 |
| | a < m | b < m | |
| Subtraction | len(a) <= len(m) | len(b) <= len(m) | 1, 2, 3, 4 |
| | a < m | b < m | |
| Additive Inverse | len(a) <= len(m) | n/a | 1, 2, 3 |
| | a < m | | |
| Multiplication | len(a) <= len(m) | len(b) <= len(m) | 1, 2, 3, 4 |
| | a < m | b < m | |
| Multiplicative Inverse | len(a) <= len(m) | n/a | 1, 2, 3, 6, 7 |
| | a < m | | |
| | gcd(a, m) = 1 | | |
| Exponentiation | len(a) = len(m) | none | 1, 2, 3 |
| | a < m | | |

The PKE includes a 4 Kbyte Big Number Cache. The Cache is organized as 256 words by WORD_SIZE bits. It is a load/store architecture, i.e., each arithmetic instruction only operates on the contents of the Big Number Cache. The PKE also includes working storage (tempA and tempB, which are not programmer visible) so that the result (r) can reuse the memory from one of its input operands.

Figure 4:
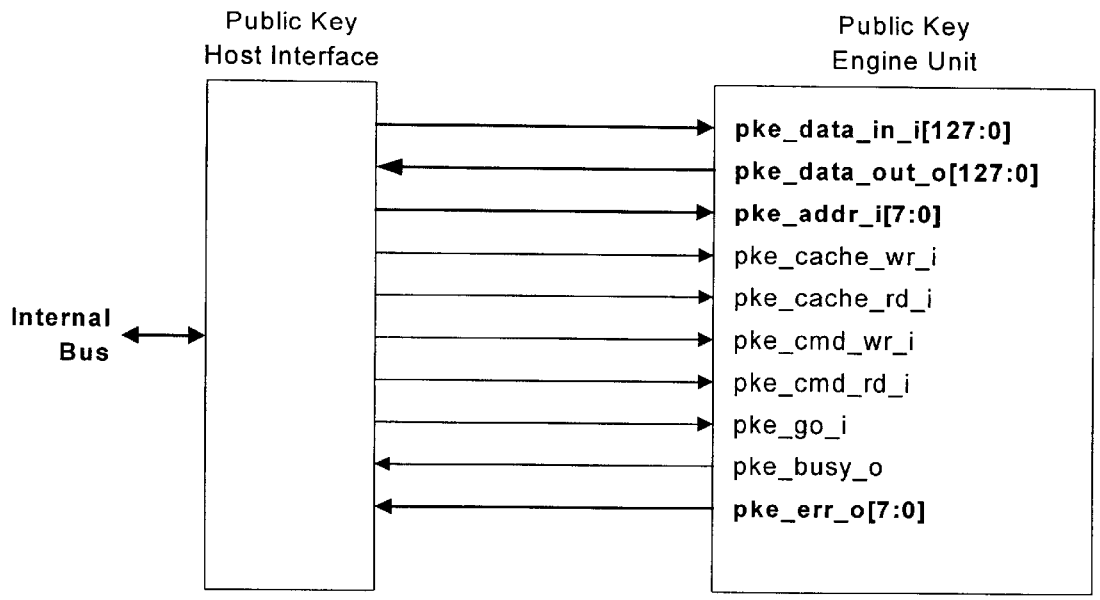
FIGS. 4–14 are diagrams of an example of embodiments of the present invention.

The PKE also includes a 32-byte command block, which is used to specify which function to execute. This block of eight 32-bit registers is loaded with the opcode and pointers to operands for a particular function. FIG. 4 is a block diagram that illustrates connection of the PKE to a public key host interface. The PKE I/O signatures are presented in Table 3 below. This table provides signal names, directions and brief descriptions.

TABLE 3

| Signal Name | Type | Description |
|---|---|---|
| clk | Input | Clock signal. |
| rst_n | Input | Active low asynchronous reset signal. |
| pke_data_in_i[WORD_SIZE-1:0] | Input | Input data bus. |
| pke_addr_i[7:0] | Input | Address bus. |
| pke_cache_wr_i | Input | Cache write. |
| pke_cache_rd_i | Input | Cache read. |
| pke_cmd_wr_i | Input | Command write. |
| pke_cmd_rd_i | Input | Command read. |
| pke_go_i | Input | Go signal. |
| pke_data_out_o[WORD_SIZE-1:0] | Output | Output data bus. |
| pke_busy_o | Output | Busy signal. |
| pke_err_o[7:0] | Output | Error flags. |

The five command signals are the pke_cache_rd/wr_i, pke_cmd_rd/wr_i, and pke_go_i pins. As a safety precaution against initiating erroneous commands, at most one of these pins can be active at any given time, otherwise no operation is initiated.

Reads or writes to the programmer-visible storage arrays (i.e. the Big Number Cache or the Command Block Registers) are accomplished by setting up a valid address (and data for a write) and pulsing one of the pke_cache/cmd_rd/wr_i signals. Both reads and writes are fully pipelined for burst operation. Read data on pke_data_out_o is held indefinitely until the next read command. The command registers are addressed by pke_addr_i[2:0], and the upper bits (i.e. pke_addr_i[7:3]) must be 0 for a command register access to occur. Table 4 below lists the read latencies.

TABLE 4

| Array | Read Latency assuming Host clock = PKE clock | Read Latency assuming Host clock = ½ PKE clock |
|---|---|---|
| Big Number Cache | 5 | 2 |
| Command Block Registers | 2 | 1 |

The Command Block Registers are loaded with a command opcode and parameter pointers and lengths. Note that since the PKE data bus is much wider than 32 bits, the PKE data bus is big-endian, the Command Block Registers are read or written on the upper 32 bits [127:96] of the PKE data bus. Table 5 below shows the format of the Command Block Registers.

TABLE 5

| Reg | Fields | | | |
|---|---|---|---|---|
| 0 | Opcode [31:28] | Reserved [27:0] | | |
| 1 | | Reserved [31:8] | | r offset [7:0] |
| 2 | Reserved [31:22] | m length [21:16] | Reserved [15:8] | m offset [7:0] |
| 3 | Reserved [31:22] | a length [21:16] | Reserved [15:8] | a offset [7:0] |
| 4 | Reserved [31:22] | b length [21:16] | Reserved [15:8] | b offset [7:0] |
| 5 | | Reserved [31:8] | | c offset [7:0] |
| 6 | | Reserved [31:0] | | |
| 7 | | Reserved [31:0] | | |

Once a command opcode and the associated parameter information have been loaded into the Command Block Registers, the pke_o_i signal can be asserted as early as the next clock cycle following a Command Block or Cache write. The PKE will respond by asserting the pke_busy_o signal until the command has completed, at which point the pke_busy_o signal will go low (provided pke_go_i has already returned low; otherwise pke_busy_o waits for pke_go_i to be de-asserted). A number of Error flags (pke_err_o) can be examined after the de-assertion of pke_busy_o to determine if the function was executed successfully. Table 6 lists the error codes.

TABLE 6

| Error Flag | Description |
|---|---|
| 0 | Illegal opcode. |
| 1 | Invalid 'r' parameter. |
| 2 | Invalid 'm' parameter. |
| 3 | Invalid 'a' parameter. |
| 4 | Invalid 'b' parameter. |
| 5 | Mult. Inv. parameters are not relatively prime (i.e., gcd(a, m) ≠ 1). |
| 6 | Mult. Inv. watchdog timer expired (should never happen). |
| 7 | <Reserved - read as 0> |

Figure 5:
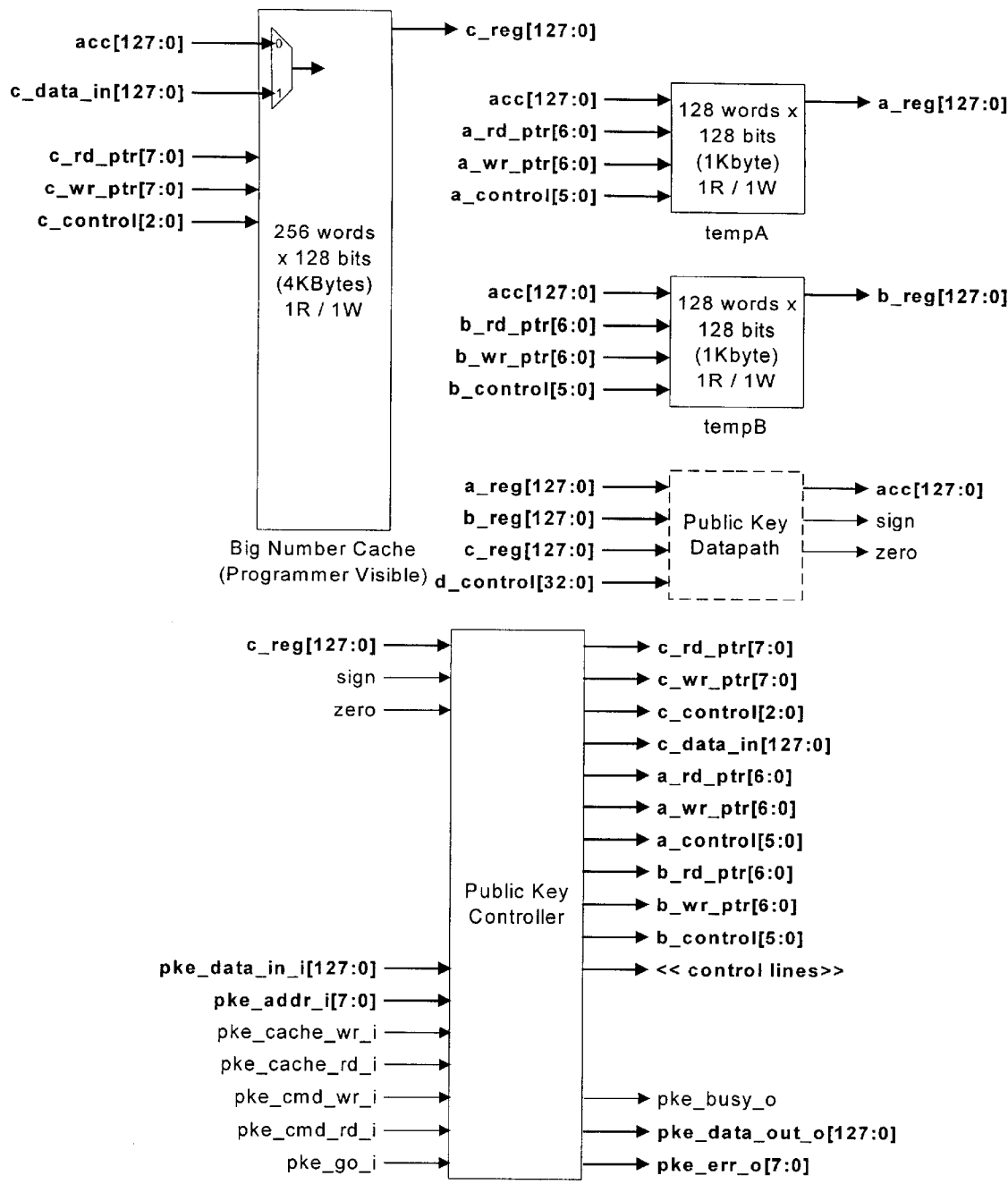

FIG. 5 is a top level block diagram of the PKE. As shown, there are four storage arrays in the PKE: a Big Number Cache, a Command Block, a tempA register and a tempB register.

The Big Number Cache (256 words by WORD_SIZE bits) is the only programmer visible memory in the PKE. The programmer accesses its contents by appending load and/or store command blocks to the command queue. Data is stored big-endian, meaning the more-significant words are at lower addresses.

The Command Block (8 words by 32 bits) resides in the Controller. It holds the opcode and parameters for one command. It is programmer visible.

The tempA (128 words by WORD_SIZE bits) register is the only working store used for all operations except exponentiation and multiplicative inverse. For multiplication, the result may need to be padded with an extra word before the modulo step. For exponentiation, tempA stores the intermediate result of a Montgomery multiplication, and tempB stores the intermediate exponentiation result, and g·R mod m. For multiplicative inverse, tempA stores u and D, and tempB stores v and B. Data is stored little-endian, meaning the more-significant words are at higher addresses. This array is not programmer visible.

The tempB (128 words by WORD_SIZE bits) register is a working store that is only used for exponentiation and multiplicative inverse. Data is stored little-endian, meaning the more-significant words are at higher addresses. This array is not programmer visible.

Table 7 shows the data sources for various registers in the datapath.

TABLE 7

| data sources | cache | creg | tempA | areg | tempB | breg |
|---|---|---|---|---|---|---|
| m' | X | | | | | |
| m | X | | | | | |
| x | | X* | | | X† | |
| y | | X* | | | X† | |
| temp | | | | X | | |
| acc_S | | | | X | | X |
| acc_C | | X | | X | | |

*multiplication
†exponentiation

Figure 12:
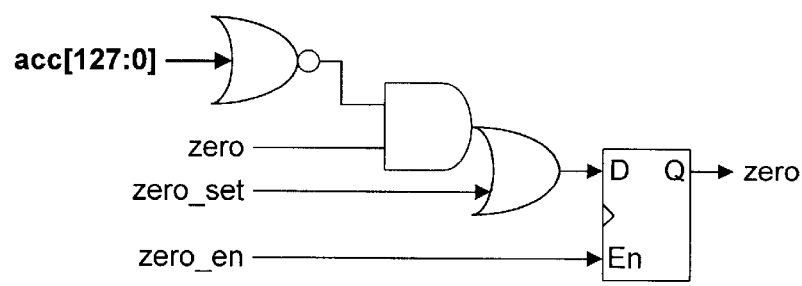
Figure 6:
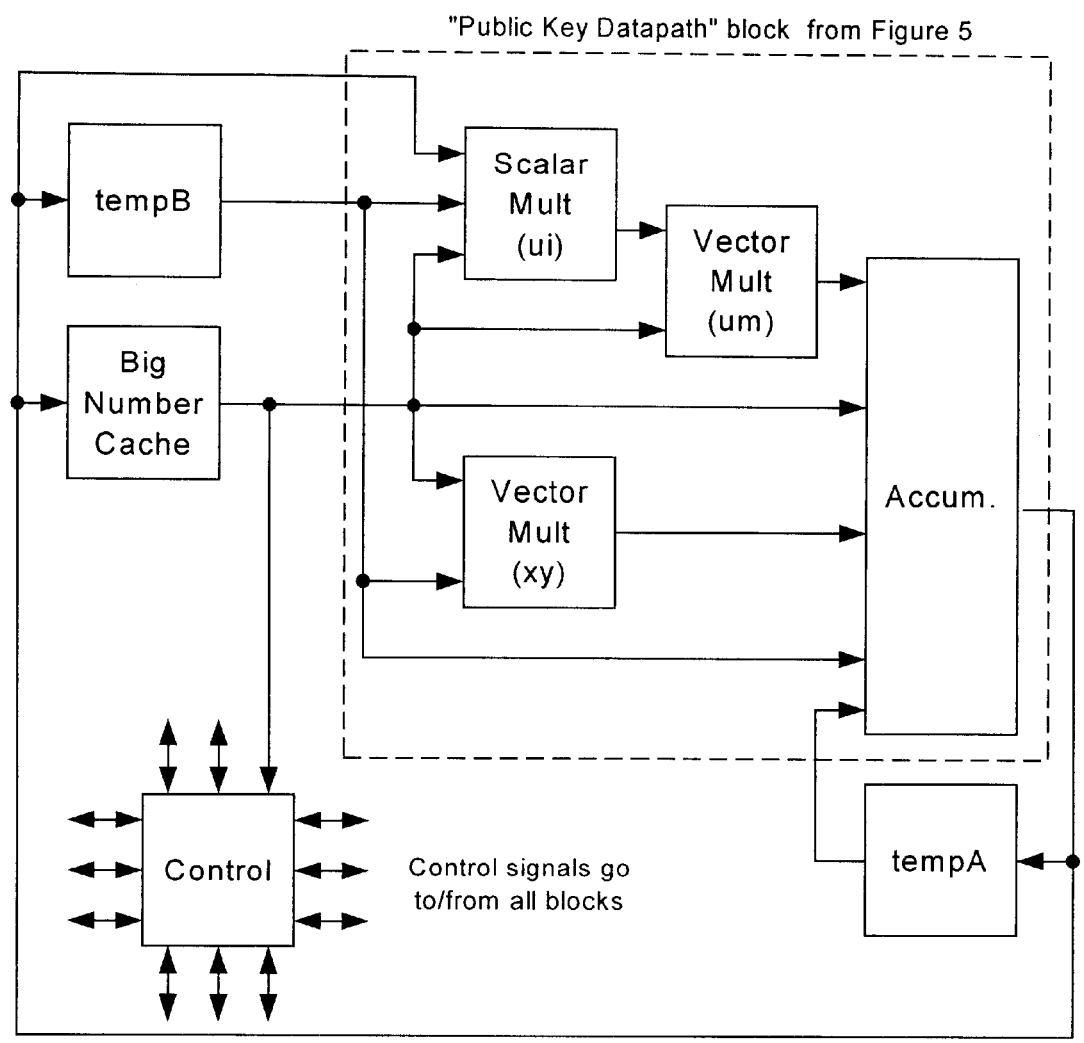
Figure 7:
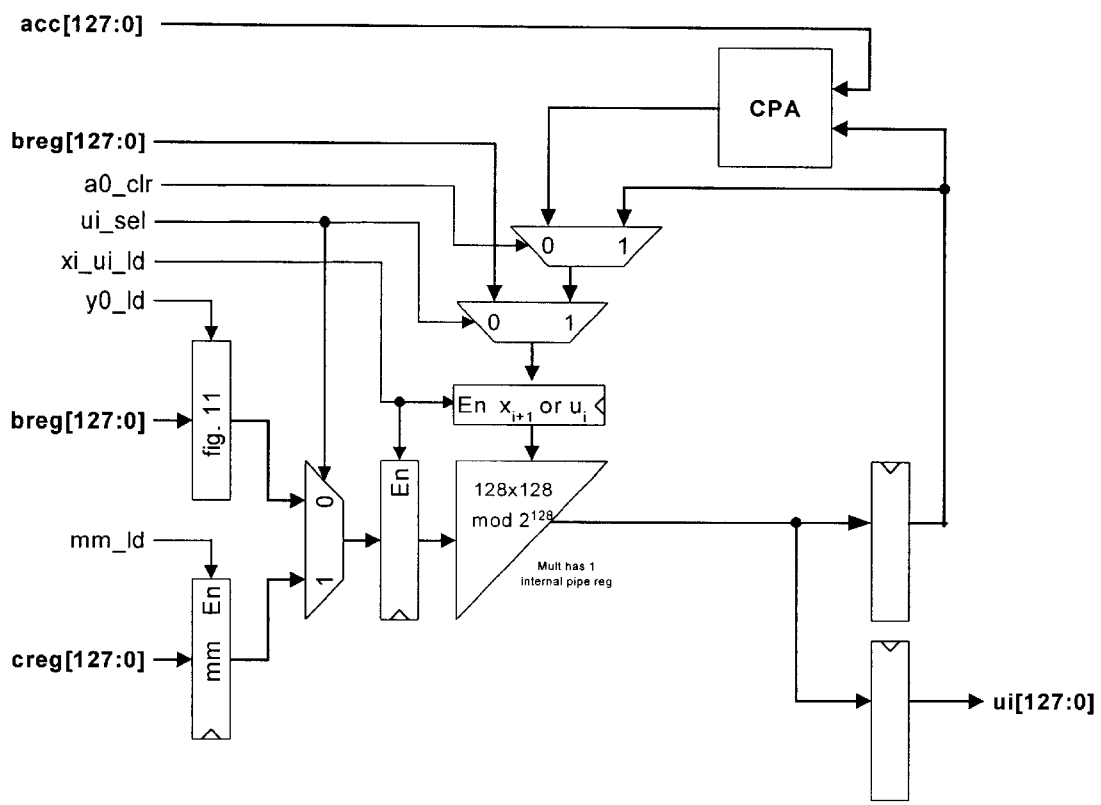
Figure 8:
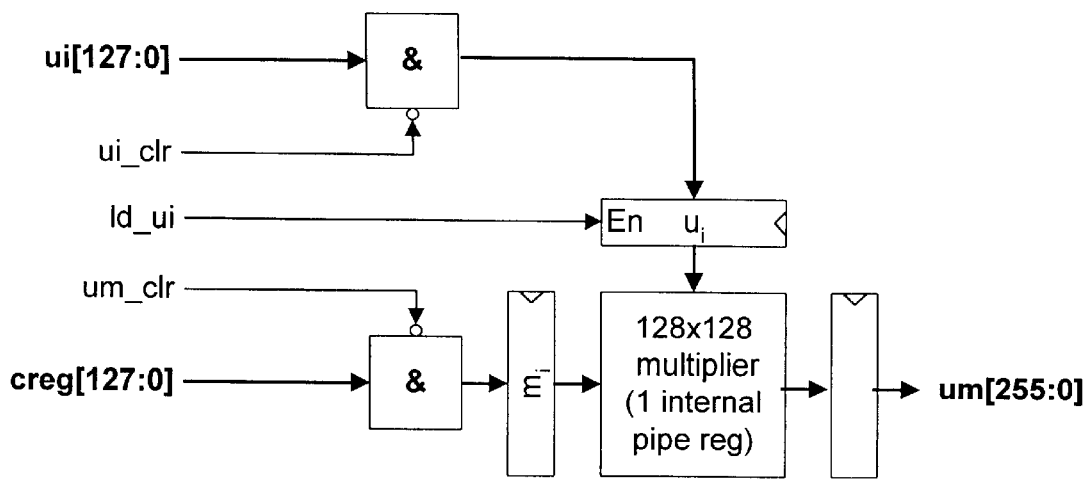
Figure 9:
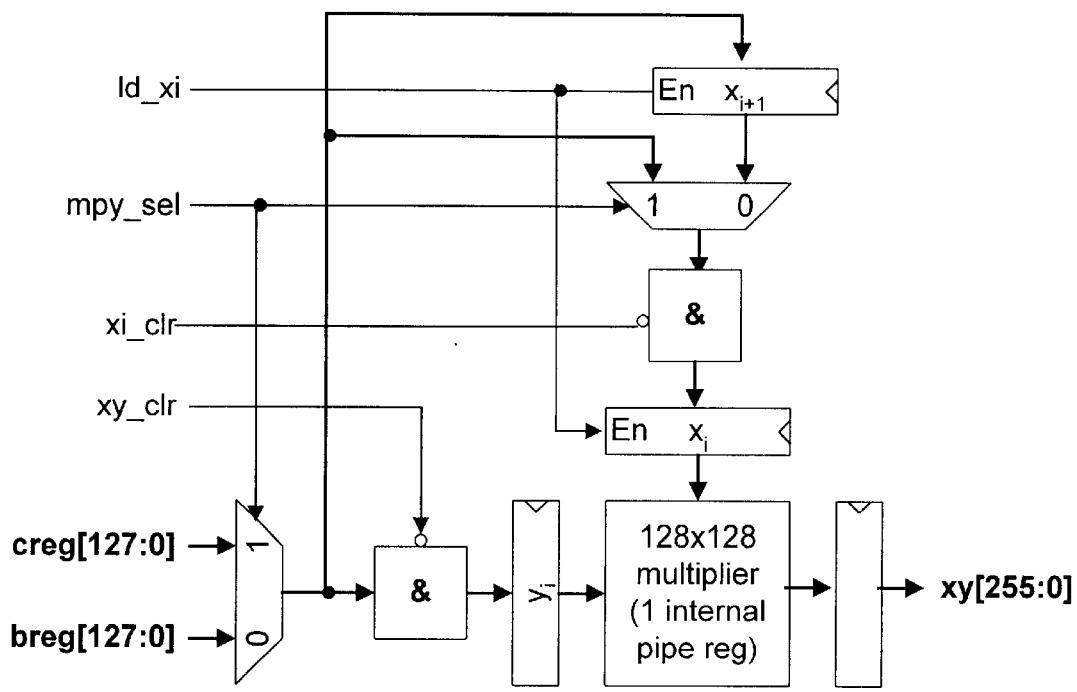
Figure 10:
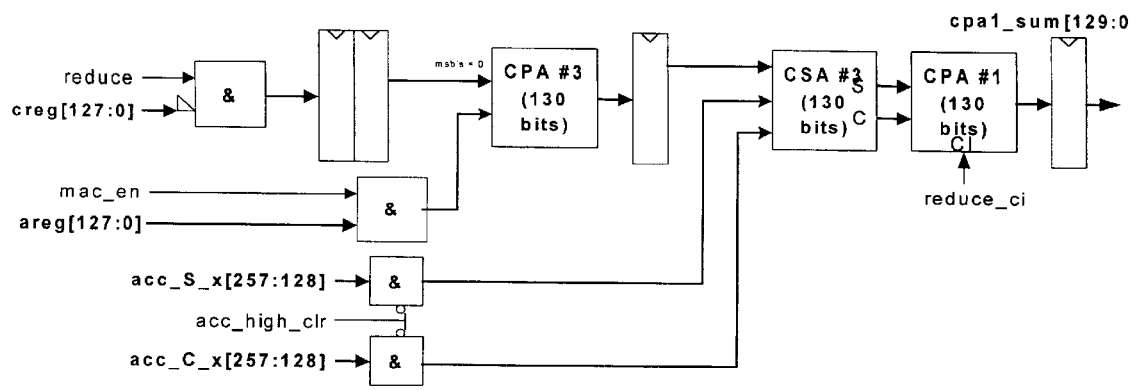
Figure 10:
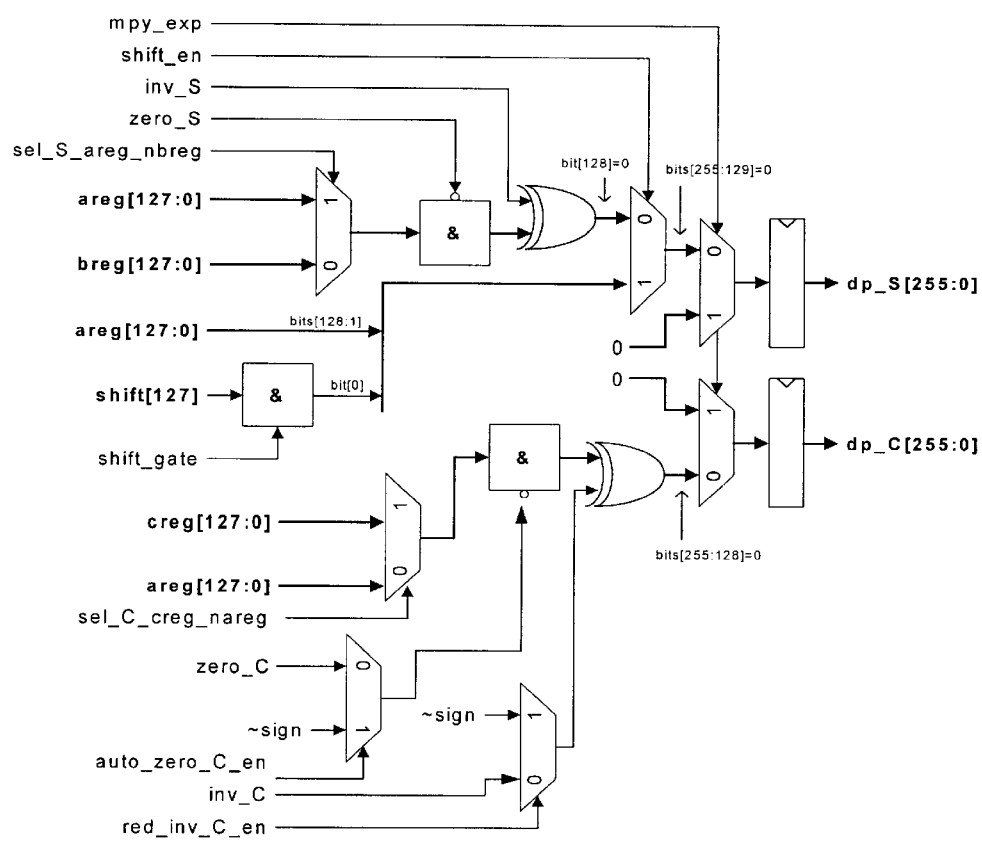
Figure 11:
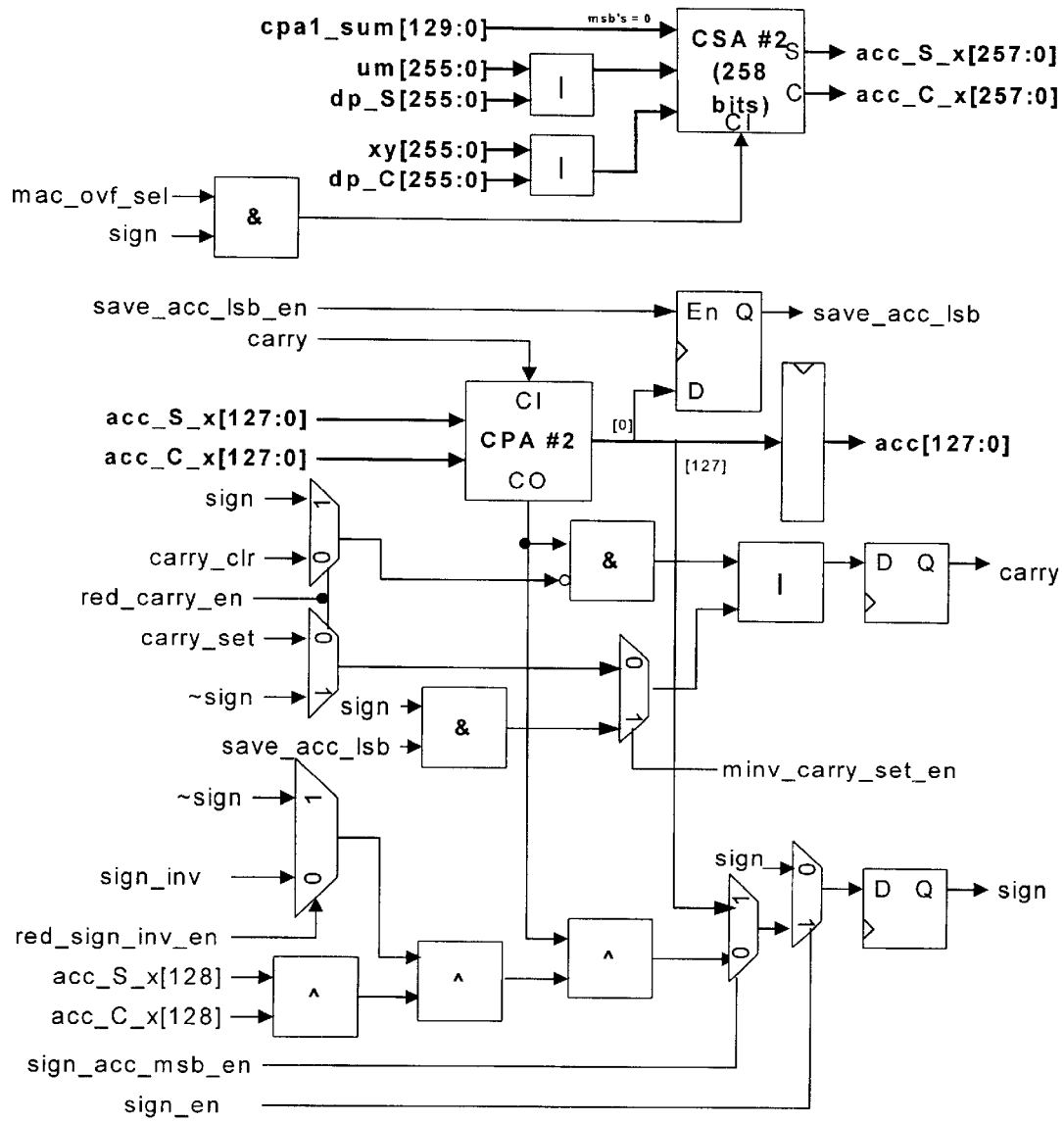

FIG. 6 is a high level block diagram of the Public Key Datapath block of FIG. 5. FIG. 7 is a block diagram of the scalar multiplier of FIG. 6. FIG. 8 is a block diagram of the vector multiplier (um) of FIG. 6. FIG. 9 is a block diagram of the vector multiplier (xy) of FIG. 6. FIGS. 10 and 11 are block diagrams of the accumulator of FIG. 6. Note that in FIG. 10, creg (m) is delayed 4 clocks which is one clock more than the multiplier latency. This aligns m with the output from the last multiplier digit. FIG. 12 is a diagram of a zero flag circuit that can produce the zero signal of FIG. 10.

Figure 13:
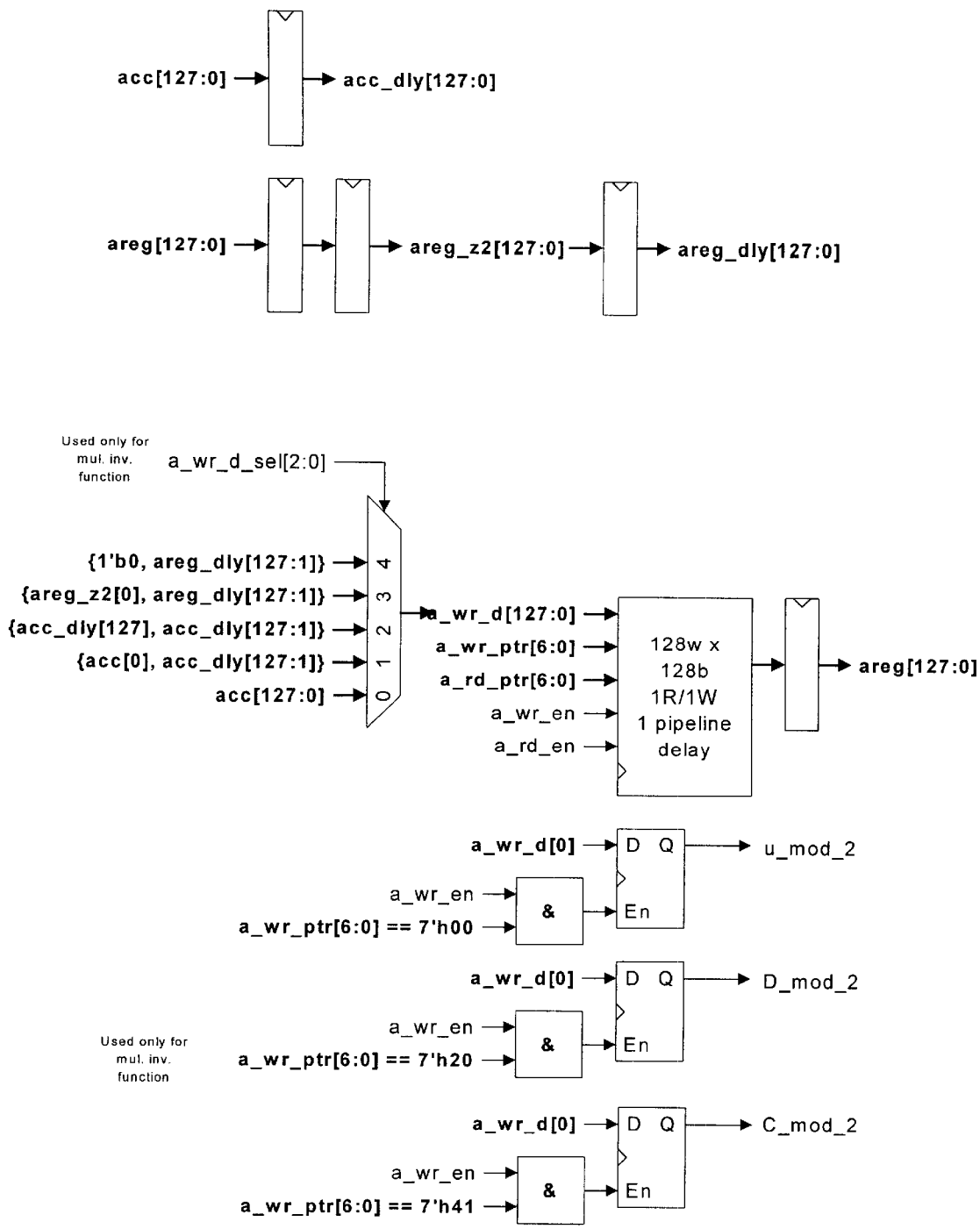
Figure 14:
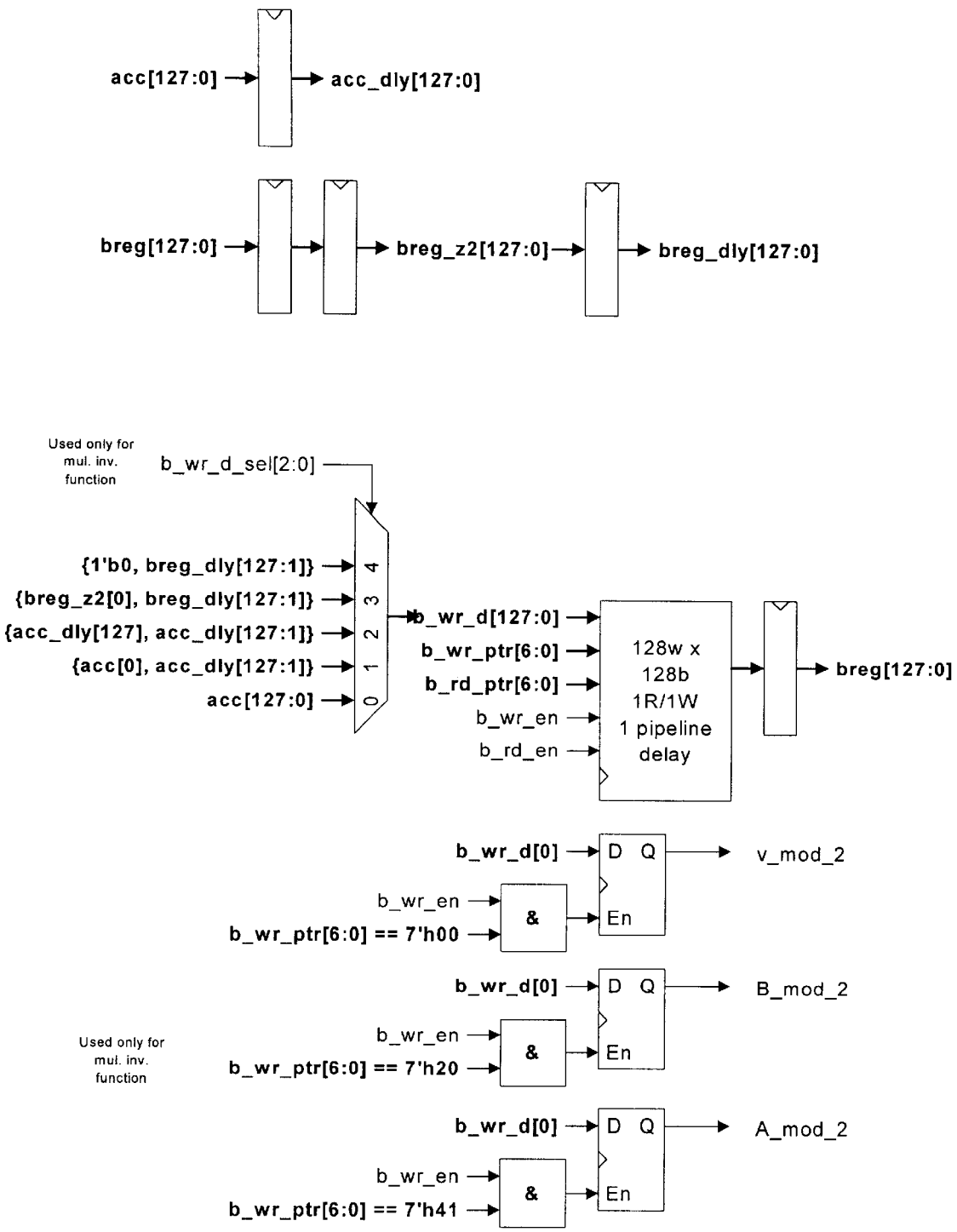

FIG. 13 is a diagram of the tempA register of FIG. 6. FIG. 14 is a diagram of the tempB register of FIG. 6. In FIG. 13, it will be noted that a purpose of delaying areg by two clock cycles is to simplify the control logic by matching the latency of (dp+acc). Also, in FIG. 14, it will be noted that a purpose of delaying breg by two clock cycles is to simplify the control logic by matching the latency of (dp+acc).

The operations that may be performed by the PKE of the Example, now will be described in detail. The operations are all defined with a parameter WORD_SIZE. The operations definitions are independent of the value of this parameter.

Mod

Mod (modulo) loads a into tempA. If (len[a]>len[m]) && ((len[a] mod WORD_SIZE)>(len[m] mod WORD_SIZE)), tempA is padded with one additional word of zeroes so that the msb of m is more significant than the msb of tempA. This implies that tempA must be at least (MAX_LENGTH/WORD_SIZE)+1 words long. This is done so that the non-restoring division algorithm does not overflow.

If len[a]=len[m], m is subtracted from tempA. If the result is negative, add back m and return the result to r. Else return the result to r. There are 4 operations. Each operation takes 5+(CEILING(len[m]/WORD_SIZE)-1) cycles to complete (5 is the latency from issuing the read command to completing the write command for the results of the operation on that word). Assume 16 clock cycles to read the command, and that new commands are read while the previous instruction is being executed. Therefore the execution time is: 16+4*[5+(CEILING(len[m]/WORD_SIZE)-1)] clock cycles.

If len[a]>len[m], m is subtracted from tempA followed by WORD_SIZE*CEILING((len[a]-len[m])/WORD_SIZE) non-restoring division steps. Each step includes either a subtraction or an addition, depending on the sign of the previous result. Each of these operations takes 5+(CEILING(len[m]/WORD_SIZE)-1) cycles to complete. Finally, if the sign of the remainder is negative, m is added back to tempA and returned to r. Else return the remainder in tempA to r. Therefore, the execution time is: 16+(5+CEILING(len[a]/WORD_SIZE))+(WORD_SIZE*CEILING((len[a]-len[m])/WORD_SIZE)+3)*(5+(CEILING(len[m]/WORD_SIZE)-1)).

R Mod m

R is defined as $2^{WORD\_SIZE*len[m]}$, and is internally generated by the Public Key Processor. The processor first loads −m into tempA, sets base, then calls modular reduction (R mod m=(R−m) mod m, which is 1 bit smaller, and therefore fits within the maximum word width of MAX_LENGTH bits, even for len[m]=MAX_LENGTH bits). If (len[m] mod WORD_SIZE))!=0, tempA is padded with one additional word of zeroes so that the msb of m is more significant than the msb of tempA, and base=1. This is done so that the non-restoring division algorithm doesn't overflow. Else base=0.

If (len[m] mod WORD_SIZE)==0, m is subtracted from tempA. If the result is negative, add back m and return the result to r. Else return the result to r. There are 4 operations. Each operation takes 5+(CEILING(len[m]/WORD_SIZE)-1) cycles to complete (5 is the latency from issuing the read command to completing the write command for the results of the operation on that word). Assume 16 clock cycles to read the command, and that new commands are read while the previous instruction is being executed. Therefore the execution time is: 16+4*[5+(CEILING(len[m]/WORD_SIZE)-1)] clock cycles.

If (len[m] mod WORD_SIZE)!=0, there is one word of numerator (tempA) to be shifted into the partial remainder. Therefore there are WORD_SIZE non-restoring division steps. Each step includes either a subtraction or an addition, depending on the sign of the previous result. Each of these operations takes 5+(CEILING(len[m]/WORD_SIZE)-1) cycles to complete. Finally, if the sign of the remainder is negative, m is added back to tempA and returned to r. Else return the remainder in tempA to r. Therefore the execution time is: 16+(WORD_SIZE+4)*(5+(CEILING(len[m]/WORD_SIZE)-1))+1.

Addition

Addition loads a into tempA. Then b is added to tempA. TempA now equals a+b. Then subtract m from tempA. These operations include one extra word beyond the length of m to include a possible carry-out from a+b. If the result is negative, add back m and return the result to r. Else return the result to r. There are 5 operations. Each operation takes 5+(CEILING(len[m]/WORD_SIZE)) cycles to complete (5 is the latency from issuing the read command to completing the write command for the results of the operation on that word). Assume 16 clock cycles to read the command, and that new commands are read while the previous instruction is being executed. Therefore the execution time is: 16+5[5+(CEILING(len[m]/WORD_SIZE))] clock cycles.

Subtraction

Subtraction loads a into tempA, then subtracts b from tempA while setting the sign, tempA=a−b. If the result is negative, add back m and return the a−b+m to r. Else return a−b to r. There are 4 operations. Each operation takes 5+(CEILING(len[m]/WORD_SIZE)-1) cycles to complete (5 is the latency from issuing the read command to completing the write command for the results of the operation on that word). Assume 16 clock cycles to read the command, and that new commands are read while the previous instruction is being executed. Therefore the execution time is: 16+4[5+(CEILING(len[m]/WORD_SIZE)1)] clock cycles.

Additive Inverse

Additive inverse negates a and loads it into tempA. If −a is negative, add m to tempA; else a==0, which is its own additive inverse, so don't add m to tempA. Return the result to r, r=−a mod m. There are 3 operations. Each operation takes 5+(CEILING(m_length/WORD_SIZE)-1) clock cycles to complete (5 is the latency from issuing the read command to completing the write command for the results of the operation on that word). Assume 16 clock cycles to read the command, and that new commands are read while the previous instruction is being executed. Therefore the execution time is (worst-case): 16+3[5+(CEILING(len[m]/WORD_SIZE)-1)] clock cycles.

Multiplication

Multiplication multiplies a*b into tempA, and then performs tempA mod m and returns the result. If CEILING((len[a]+len[b])/WORD_SIZE)<CEILING(len[m]/WORD_SIZE), zero-pad tempA up to CEILING(len[m]/WORD_SIZE). If ((len[a]+len[b])>len[m]) && (((len[a]+len[b]) mod WORD_SIZE)>(len[m] mod WORD_SIZE)), tempA is padded with one additional word of zeroes so that the msb of m is more significant than the msb of tempA (this is so that the non-restoring division algorithm does not overflow). This implies that temp must be at least (2*MAX_LENGTH/WORD_SIZE)+1 words long. base=ceiling((a_len+b_len−m_len)÷WORD_SIZE). This is the offset of the lsw of m from tempA[0] that aligns the msw of m with the msw of temp.

The performance of the modulo function is described above, so here only the multiplication is described. Since a and b are both in the cache, and the cache only has one read port, only one digit from each word is read at a time. b is the multiplier, and a is the multiplicand. Each digit of b, starting from the lsw, is multiplied times all of a and stored in tempA. Each partial product is 1 digit longer than a. After the first partial product is stored, each successive partial product is added to the next partial product shifted up one digit. There are CEILING(len[b]/WORD_SIZE) multiplier digits, and each partial product takes 5+CEILING(len[a]/WORD_SIZE)+1 cycles to complete. Therefore the execution time for the multiplication step is CEILING(len[b]/WORD_SIZE)*(5+CEILING(len[a]/WORD_SIZE)+1) clock cycles. The execution time for the entire operation, including the modulus, is found by adding this value to the time for the modulus, where len[a']=len[a]+len[b]. Therefore the total execution time is (assuming len[a]+len[b]>len[m]), which is the worst-case: 16+CEILING(len[b]/WORD_SIZE)*(5+CEILING(len[a]/WORD_SIZE)+1)+WORD_SIZE*(CEILING((len[a]+len[b]−len[m])/WORD_SIZE)+2)*(5+(CEILING(len[m]/WORD_SIZE)-1)).

The size of the output of each digit and of the output of each loop should be known, in order to allocate adequate storage. Consider the multiplication of the first digit of the multiplier times the first digit of the multiplicand. In this case, the previous partial product=0. Therefore this partial result is: $=(2^{WORD\_SIZE}-1)*(2^{WORD\_SIZE}-1)=2^{2*WORD\_SIZE}-2^{WORD\_SIZE+1}+2^0$.

As the least-significant digit of this partial result is shifted out, and the remaining bits of this partial result are accumulated with the products of subsequent multiplicand digits, each following partial result is: $=(2^{2*WORD\_SIZE}-2^{WORD\_SIZE+1}+2^0)+(2^{WORD\_SIZE}-2^1)=2^{2*WORD\_SIZE}-2^{WORD\_SIZE}-2^0$.

For subsequent multiplier digits previous partial product=0. Therefore, the partial result of a subsequent multiplier digit and the first multiplicand digit is: $=(2^{2*WORD\_SIZE}-2^{WORD\_SIZE+1}+2^0)+(2^{WORD\_SIZE}-2^0)=2^{2*WORD\_SIZE}-2^{WORD\_SIZE}$.

As the least-significant digit of this result is shifted out, and the remaining bits of this partial result are accumulated with the products of subsequent multiplicand digits, each following partial result is: $=(2^{2*WORD\_SIZE}-2^{WORD\_SIZE})+(2^{WORD\_SIZE}-2^0)=2^{2*WORD\_SIZE}-2^0$.

Therefore, the product of each multiplier and multiplicand digit accumulated with previous digits is 2 digits long. Each partial product is 1 digit longer than the multiplicand, and the length of the result is the sum of the digits in the multiplier and the multiplicand.

Multiplicative Inverse

Multiplicative inverse loads u=m and D=1 into tempA and v=a and B=0 into tempB. This takes 4*(5+CEILING(len[m]/128)-1)+2 clock cycles to complete. 5 clock cycles is the latency from issuing the read command to completing the write command for the results of the operation on that word. There are CEILING(len[m]/128) words in u and v but CEILING(len[m]/128)+1 words in B and D. There is a guard word added to the top of B and D to avoid overflow in the intermediate results. The algorithm uses in the worst case 4*(len[m]+1) outer loop iterations, where each inner loop uses 5 operations. The first two operations take 2*(6+CEILING(len[m]/128) cycles. For these first two operations, the result is stored >>1, which adds one extra clock cycle to the latency. The other three operations take 3*(5+(CEILING (len[m]/128)-1))+1 cycles to complete. Finally, there are four operations to convert D to the output. These take 4*(5+(CEILING(len[m]/128)-1))+1 cycles to complete. Assume 16 clock cycles to read the command, and that new commands are read while the previous instruction is being executed. Therefore the execution time is: 16+8*(5+(CEILING(len[m]/128)-1))+3+4*(len[m]+1)*(2*[6+CEILING(len[m]/128)]+3*[5+(CEILING(len[m]/128)-1)]+1) clock cycles.

Exponentiation

Exponentiation first copies g*R mod m into tempB twice, then performs Montgomery exponentiation. This uses len [exponent]+Hamming Weight[exponent] Montgomery multiplies, where len[exponent] is the number of significant bits in the exponent. For random numbers, this can be very close to 1.5*len[exponent]. The Montgomery multiplication algorithm is implemented according to the above-cited Menezes et al. reference. Each digit of the multiplier is multiplied times the multiplicand and added to the previous partial result, producing an n+1 digit partial result. The top n digits are stored (actually an n+1 digit+1 bit result: the overflow bit is stored in a register in the datapath). The least significant digit of each partial result is fed back to the scalar multiplier for the next result via a sneak path, so this need not add any delay or latency to the result. However, the first digit uses an extra multiplier latency to fill the pipeline. At the end of each multiplication, subtract m from the result (this subtraction is folded into the last loop iteration). If the result is negative add back m, else continue. Finally, copy the result to r. Therefore, the total execution time is: 16+3*(5+(CEILING (len[m]/128)-1))+1.5*len[exponent]*{12+(CEILING(len [m]/128)*(CEILING((len[m])/128)+1)+(5+(CEILING(len [m]/128)-1))}.

The Montgomery exponentiation algorithm is according to the above-cited Menezes, et al. reference, and modified to eliminate extraneous multiplies. The Montgomery multiplication algorithm is also according to the above-cited Menezes et al. reference. This is a highly parallel version of the Montgomery algorithm. The hardware is designed to exploit the parallelism of this algorithm. It executes the inner loop with minimum latency and the maximum possible throughput, which may be limited mainly by the multipliers. The algorithm operates on digits of the numbers. Each number is divided into n digits of WORD_SIZE length. The inputs are the modulus m, a multiplier x and a multiplicand y, each of which is mod m, $R=2^{n*WORD\_SIZE}$, and $m'=-m[0]^{-1}$ mod $2^{WORD\_SIZE}$.

A-0;
   for i from 0 to n-1 do {
      u[i]=((A[0]+x[i]*y[0])*m') mod $2^{WORD\_SIZE}$;
      for j from 0 to n-1 do
         A'[j]=(A[j]+x[i]*y[j]+u[i]*m[j])/$2^{WORD\_SIZE}$;
      }
   if A=m {
      A=A-m;
   }
   return (A);

The vector multiplication in the second step of the loop is performed one digit of the multiplicand at a time. The size of the output of each digit and of the output of each loop should be known to allocate adequate storage. Consider the multiplication of the first digit of the multiplier times the first digit of the multiplicand. In this case, A=0. Therefore this partial result is: $=(2^1*(2^{WORD\_SIZE}-1)*(2^{WORD\_}SIZE-1))=2^{2*WORD\_SIZE+1}-2^{WORD\_SIZE+2}+2^1$.

As the least-significant digit of this partial result is shifted out, and the remaining bits of this partial result are accumulated with the products of subsequent multiplicand digits, each following partial result is: $=(2^{2*WORD\_SIZE+1}-2^{WORD\_SIZE+2}+2^1)+(2^{WORD\_SIZE+1}-2^2)=2^{2*WORD\_SIZE+1}-2^{WORD\_SIZE+1}-2^1$.

Therefore, each the result of each digit multiplication is 2*WORD_SIZE+1 bits long, and the result of the first step of the loop before the division by $2^{WORD\_SIZE}$ is (n+1)*WORD_SIZE+1 bits long. For subsequent multiplier digits A=0. Therefore, the partial result of a subsequent multiplier digit and the first multiplicand digit is: $=(2^{2*WORD\_SIZE+1}-2^{WORD\_SIZE+2}+2^1)+(2^{WORD\_}SIZE-2^0)=2^{2*WORD\_SIZE+1}-2^{WORD\_SIZE+1}-2^{WORD\_SIZE}+2^0$.

As the least-significant digit of this result is shifted out, and the remaining bits of this partial result are accumulated with the products of subsequent multiplicand digits, each following partial result is: $=(2^{2*WORD\_SIZE+1}-2^{WORD\_SIZE+}1-2^{WORD\_SIZE}+2^0)+(2^{WORD\_SIZE+1}-2^1-2^0)=2^{2*WORD\_SIZE+}1-2^{WORD\_SIZE}-2^1$.

This result is consistent with the final step of the Montgomery multiplication algorithm. If the size of the result were any larger, than A−m could not equal $xyR^{-1}$ mod m. It allows saving only n+1 digits per multiplier digit, rather than n+2, by using a single register and small amount of logic to save the overflow bit from each loop iteration. That bit is added to the most-significant product of the next multiplier digit. This fact also can be used while folding the comparison of A with m into the last loop iteration. Since a positive number is being subtracted from another positive number, the sign=0^1^ carry out of the most-significant bit. This result indicates which is the most-significant bit.

The hardware implementation overlaps the vector multiplication at the end of each loop iteration with the scalar multiplies at the beginning of the next. First, y[0] is loaded. Then, x[0] is loaded, and u[0]=x[0]*y[0]. At this point, there is no previous partial result, so u[0]=u[0]*m'. In the next clock cycle, x[1] is loaded into the scalar multiplier and x[0] is pipelined into the vector multiplier while u[i] is loaded into the vector multiplier. When the vector multiplier produces the first digit of the result, it is loaded into the scalar multiplier to produce u[1]=u[1]*a[0]. Since all of the multipliers should have the same latency, as long as the latency through the scalar multiplier times two is ≦ the number of digits in the multiplicand, the latency of the scalar multiplier need only appear before the first vector multiply, and can be hidden thereafter. If not, then the performance may only square linearly, rather than as the square, for "small" numbers.

task montgomery_multiplication( );
   /*Do the Montgomery multiplication, including the test and correction for A=m. base points to the multiplier, either gR mod m or A, the intermediate exponentiation result. The multiplicand is always A. If the base register points to gR mod m, the operation is a multiplication, and if the base register points to A, the operation is a squaring. */endtask//montgomery_multiplication In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A Montgomery multiplier that modulo multiplies a residue multiplicand by a residue multiplier to obtain a residue product, the Montgomery multiplier comprising:
   a scalar multiplier that is configured to multiply a least significant digit of the multiplicand by a first selected digit of the multiplier to produce a scalar multiplier output;
   a first vector multiplier that is configured to multiply the scalar multiplier output by a modulus to produce a first vector multiplier output;
   a second vector multiplier that is configured to multiply a second selected digit of the multiplier by the multiplicand to produce a second vector multiplier output; and
   an accumulator that is configured to add the first vector multiplier output and the second vector multiplier output to produce a product output.

2. A Montgomery multiplier according to claim 1 wherein the scalar multiplier is further configured to multiply the least significant digit of the multiplicand by the first selected digit of the multiplier and by one over a negative of a least significant digit of the modulus to produce the scalar multiplier output.

3. A Montgomery multiplier according to claim 2 further comprising a first multiplexer that is configured to multiplex the least significant digit of the multiplicand and one over the negative of the least significant digit of the modulus into the scalar multiplier.

4. A Montgomery multiplier according to claim 1 further comprising a first feedback path that is configured to feed the scalar multiplier output back into the scalar multiplier.

5. A Montgomery multiplier according to claim 4 further comprising a second feedback path that is configured to feed the product output back into the scalar multiplier.

6. A Montgomery multiplier according to claim 5 further comprising a second summer that is configured to sum the scalar multiplier output and the product output from the respective first and second feedback paths, and to provide the sum of the scalar multiplier output and the product output to the scalar multiplier.

7. A Montgomery multiplier according to claim 6 further comprising a second multiplexer that is configured to multiplex the first selected digit of the multiplier and the sum of the scalar multiplier output and the product output into the scalar multiplier.

8. A Montgomery multiplier according to claim 4 further comprising a second multiplexer that is configured to multiplex the first selected digit of the multiplier and the scalar multiplier output into the scalar multiplier.

9. A Montgomery multiplier according to claim 1 further comprising a second feedback path that is configured to feed the product output back into the scalar multiplier.

10. A Montgomery multiplier according to claim 9 further comprising a second multiplexer that is configured to multiplex the first selected digit of the multiplier and the product output into the scalar multiplier.

11. A Montgomery multiplier according to claim 9 further comprising a second register that is coupled between the product output and the second feedback path.

12. A Montgomery multiplier according to claim 1 further comprising a first register that is coupled between the scalar multiplier output and the first vector multiplier.

13. A Montgomery multiplier according to claim 1 wherein the first selected digit of the multiplier is different from the second selected digit of the multiplier.

14. A Montgomery multiplier according to claim 13 wherein the second selected digit of the multiplier is a next more significant digit of the multiplier, relative to the first selected digit of the multiplier.

15. A Montgomery multiplier that modulo multiplies a residue multiplicand by a residue multiplier to obtain a residue product, the Montgomery multiplier comprising:
   a scalar multiplier;
   a first vector multiplier;
   a second vector multiplier; and
   a controller that is configured to control the scalar multiplier, the first vector multiplier and the second vector multiplier to overlap scalar multiplies using a selected digit of the multiplier and vector multiplies using a modulus and the multiplicand.

16. A Montgomery multiplier according to claim 15 wherein the controller is further configured to control the scalar multiplier to perform a scalar multiply using a least significant digit of the multiplier prior to controlling the vector multipliers to perform the vector multiplies using the modulus and the multiplicand.

17. A Montgomery multiplier according to claim 15 wherein the controller is further configured to control the scalar multiplier to multiply a least significant digit of the multiplicand by a first selected digit of the multiplier to produce a scalar multiplier output, to control the first vector multiplier to multiply the scalar multiplier output by the modulus to produce a first vector multiplier output and to control the second vector multiplier to multiply a second selected digit of the multiplier by the multiplicand to produce a second vector multiplier output.

18. A Montgomery multiplier according to claim 17 further comprising:
   an accumulator that is configured to add the first vector multiplier output and the second vector multiplier output to produce a product output.

19. A Montgomery multiplier according to claim 17 the controller is further configured to control the scalar multiplier to multiply the least significant digit of the multiplicand by the first selected digit of the multiplier by and one over a negative of a least significant digit of a modulus to produce the scalar multiplier output.

20. A Montgomery multiplier according to claim 19 wherein the controller is further configured to multiplex the least significant digit of the multiplicand and one over the negative of the least significant digit of the modulus into the scalar multiplier.

21. A Montgomery multiplier according to claim 20 wherein the controller is further configured to multiplex the first selected digit of the multiplier and the sum of the scalar multiplier output and the product output into the scalar multiplier.

22. A Montgomery multiplication method that modulo multiplies a residue multiplicand by a residue multiplier to obtain a residue product, the Montgomery multiplication method comprising:
   multiplying a least significant digit of the multiplicand by a first selected digit of the multiplier in a scalar multiplier to produce a scalar multiplier output;
   multiplying the scalar multiplier output by a modulus in a first vector multiplier to produce a first vector multiplier output;
   multiplying a second selected digit of the multiplier by the multiplicand in a second vector multiplier to produce a second vector multiplier output; and
   adding the first vector multiplier output and the second vector multiplier output to produce a product output.

23. A method according to claim 22 further comprising multiplying the least significant digit of the multiplicand by the first selected digit of the multiplier and by one over a negative of a least significant digit of the modulus in the scalar multiplier to produce the scalar multiplier output.

24. A method according to claim 23 further comprising multiplexing the least significant digit of the multiplicand and one over the negative of the least significant digit of the modulus into the scalar multiplier.

25. A method according to claim 22 further comprising feeding the scalar multiplier output back into the scalar multiplier.

26. A method according to claim 25 further comprising feeding the product output back into the scalar multiplier.

27. A method according to claim 25 further comprising multiplexing the first selected digit of the multiplier and the scalar multiplier output into the scalar multiplier.

28. A method according to claim 22 further comprising feeding the product output back into the scalar multiplier.

29. A method according to claim 28 further comprising multiplexing the first selected digit of the multiplier and the product output into the scalar multiplier.

30. A method according to claim 22 further comprising summing the scalar multiplier output and the product output, and providing the sum of the scalar multiplier output and the product output to the scalar multiplier.

31. A method according to claim 30 further comprising multiplexing the first selected digit of the multiplier and the sum of the scalar multiplier output and the product output into the scalar multiplier.

32. A method according to claim 22 wherein the first selected digit of the multiplier is different from the second selected digit of the multiplier.

33. A method according to claim 32 wherein the second selected digit of the multiplier is a next more significant digit of the multiplier, relative to the first selected digit of the multiplier.

34. A Montgomery multiplication method that modulo multiplies a residue multiplicand by a residue multiplier to obtain a residue product, using a scalar multiplier, a first vector multiplier and a second vector multiplier; the Montgomery multiplication method comprising:

controlling the scalar multiplier, the first vector multiplier and the second vector multiplier to overlap scalar multiplies using a selected digit of the multiplier and vector multiplies using a modulus and the multiplicand.

35. A method according to claim 34 further comprising controlling the scalar multiplier to perform a scalar multiply using a least significant digit of the multiplier prior to controlling the vector multipliers to perform the vector multiplies using the modulus and the multiplicand.

36. A method according to claim 34 wherein the controlling comprises:

controlling the scalar multiplier to multiply a least significant digit of the multiplicand by a first selected digit of the multiplier to produce a scalar multiplier output;

controlling the first vector multiplier to multiply the scalar multiplier output by the modulus to produce a first vector multiplier output; and controlling the second vector multiplier to multiply a second selected digit of the multiplier by the multiplicand to produce a second vector multiplier output.

37. A method according to claim 36 further comprising:

adding the first vector multiplier output and the second vector multiplier output to produce a product output.

38. A method according to claim 36 further comprising controlling the scalar multiplier to multiply the least significant digit of the multiplicand by the first selected digit of the multiplier and by one over a negative of a least significant digit of a modulus to produce the scalar multiplier output.

39. A method according to claim 38 further comprising multiplexing the least significant digit of the multiplicand and one over the negative of the least significant digit of the modulus into the scalar multiplier.

40. A method according to claim 39 further comprising multiplexing the first selected digit of the multiplier and the sum of the scalar multiplier output and the product output into the scalar multiplier.

* * * * *